Aug. 5, 1947.  A. H. LAMB  2,425,250
ENCASED ELECTRICAL DEVICE
Filed Jan. 31, 1945

Inventor:
Anthony H. Lamb,
By Pierce & Scheffler.
Attorneys.

Patented Aug. 5, 1947

2,425,250

UNITED STATES PATENT OFFICE 2,425,250

ENCASED ELECTRICAL DEVICE

Anthony H. Lamb, Hillside, N. J., assignor to Weston Electrical Instrument Corporation, Newark, N. J., a corporation of New Jersey Application January 31, 1945, Serial No. 575,518

3 Claims. (Cl. 250—41.5)

This invention relates to encased electrical devices and more particularly to new arrangements for protecting encased electrical devices, such as photocells and/or measuring instruments from moisture, fumes and the like.

Electrical measuring instruments of the sensitive galvanometer type include coils of fine enamel-coated copper wire that is subject to attack by moisture and fumes at points where the enamel coating is incomplete or is cracked during the winding operation. Measuring instruments, photocells and photocell-instrument assemblies, such as light meters and exposure meters, are usually housed within casings that are made as air tight and moisture proof as possible, but the sealing of the housings may not be perfect initially or after a period of use and, since it is impossible to remove and to keep out all moisture and acids as they may be present in the internal cell parts, the instrument coils may be damaged and the cells may be of poor stability and failing sensitivity. Rusting of the base electrode under the selenium layer will decrease the output and may result in a peeling of the selenium layer from the base. Furthermore, the light sensitive surface may be attacked seriously by moisture and fumes.

Objects of the present invention are to provide encased electrical devices such as instruments, photocells and photocell assemblies that are protected against moisture and harmful vapors. An object is to provide encased electrical devices that have a non-deliquescent absorbing agent, such as silica gel, within the casings to attract and hold harmful vapors that may be initially within or that may leak into the casings. A further object is to provide an encased electrical device that has a colored absorbing agent within the casing for indicating, by a change in the color of the agent, the moisture condition of the atmosphere within the casing.

These and other objects and advantages of the invention will be apparent from the following specification when taken with the accompanying drawing in which.

Figure 1:
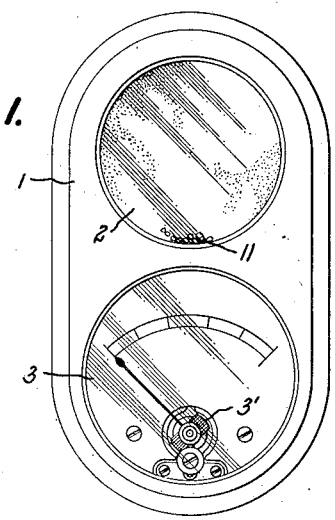
Fig. 1 is a front elevation of a photoelectric light meter embodying the invention.
Figure 2:
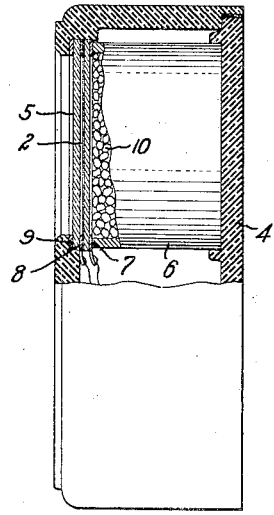
Fig. 2 is a side elevation, with parts in section, of the light meter.

In Figs. 1 and 2 of the drawings, the reference numeral 1 identifies the casing which houses the photocell 2 and milliammeter 3 of a known type of light meter, the milliammeter including a pivotally mounted coil 3' of fine wire. The rear closure 4 may be cemented to the casing, or a sealing material, not shown, may be arranged along the joint when the closure is secured to the casing by screws. The photocell 1 and its associated terminal members are held in assembled relation at the rear of the glass window 5 by a tube 6 that extends forwardly from the closure 4 to seat against the back terminal ring 7. The front terminal ring 8 rests against the glass 5 or against an interposed gasket, not shown, and a gasket 9 is provided between the glass 5 and the casing 1 to form a tight joint.

The parts as so far described are of known construction. According to this invention, a quantity of solid absorbing material 10, such as small pieces of silica gel, is arranged within the tube 6 to take up moisture and vapors that may be initially within the casing 1 when the closure 4 is sealed upon it, or that may leak into the casing at some later time. The fine wire of the instrument coil and the photocell are protected from damage so long as the moisture and fumes within the casing 1 are absorbed by the silica gel.

If the casing is not moisture tight, the "breathing" of the casing with temperature changes may eventually result in the presence of free moisture and fumes within the casing. This condition may be indicated visually by placing a few grains 11 of silica gel in the space between the cell 2 and the window 5, the silica gel being dyed with a hygroscopic substance which assumes alternative colors, in a reversible manner, according to the relative humidity of the surrounding atmosphere at the particular instant. The colored silica gel grains obscure only a negligible portion of the photocell and do not affect the accuracy of the light readings. The colored grains are loose in space back of the window 5 and will tumble about when the light meter is handled, thus forming a movable signal that will not escape the attention of the person using the meter.

Figure 3:
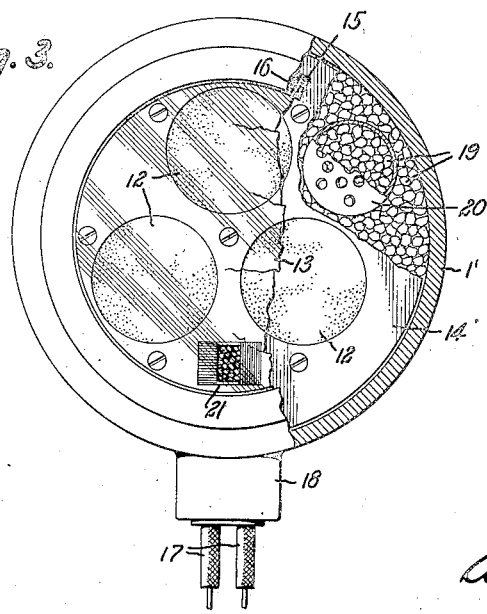
Fig. 3 is a fragmentary plan view, with parts broken away, of a multiple cell light target embodying the invention.
Figure 4:
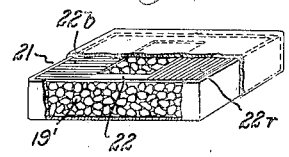
Fig. 4 is a perspective view, with parts broken away, of the moisture-indicating unit of Fig. 3.

The light target of Fig. 3 is another commercial form of an encased electrical device in which the invention may be incorporated. The casing 1' is of generally cylindrical form for housing a plurality of photocells 12 that are supported back of a cover glass 13 and the openings in a plate 14, with gaskets 15, 16 between the cover glass 13 and, respectively, the plate 14 and inturned front flange of the casing 1'. The photocells 12 are connected in parallel to the terminal wires 17 that extend to the exterior of the casing through a hollow mounting stud 18 in which they are sealed by wax and/or other packing material. A quantity of loose absorbent material 19 is placed in the casing 1' before the back closure, not shown, is applied and sealed, or the absorbent material may be in perforated containers 20. Preferably, as shown, one or more containers 20 are placed within the casing 1', and additional loose absorbent material 19 is then introduced to fill or to partially fill the remaining free space within the casing. A moisture indicator 21 is located between the cover glass 13 and plate 14, and comprises a shallow box or capsule containing absorbent material 19' colored with a hygroscopic dye. The box, or at least the cover, is formed of a transparent plastic, and a card 22 is arranged over the dyed absorbent, the card 22 having a window opening between panels 22b, 22r that are printed in the respective colors of the absorbent material when free from moisture and of absorbent material after it has taken up a quantity of moisture.

It will be apparent that activated charcoal and other solid absorbent materials may be used, and that the visual signal of the presence of moisture may be a hygroscopic element other than a dyed absorbent, for example a thread or hair. The invention is not limited to the particular encased electrical devices herein shown and described, and the sealed housings of other instruments, cells or cell-instrument assemblies may be provided with the self-contained absorbent material and, if desired, with a visual indicator of the moisture condition within the housing.

I claim:

1. In a photoelectric device, a substantially sealed housing having a transparent window at a wall thereof, a photocell of the disk type within said housing and exposed to view through said window, solid non-deliquescent absorbent material within said housing, and a moisture indicator of the reversible color type within said housing and exposed to view through said window; said moisture indicator comprising a non-deliquescent absorbent dyed with a reversible color hygroscopic dye, and a reference color chart immediately adjacent said dyed absorbent and colored with the respective colors of the dyed absorbent when free from moisture and after absorbing a quantity of moisture.

2. An electrical device comprising a substantially sealed housing having a transparent window at a wall thereof, an electrical device within said housing and of a type detrimentally affected by moisture, solid non-deliquescent absorbent material within said housing, and a moisture indicator of the reversible color type within said housing adjacent to and exposed to view through said window; said moisture indicator comprising a non-deliquescent absorbent dyed with a reversible color hygroscopic dye, and a reference color chart having panels adjacent the dyed absorbent and colored with the respective colors of the dyed absorbent when free from and after absorbing moisture.

3. An electrical device as recited in claim 2, wherein said moisture indicator includes a box containing the dyed absorbent and having a transparent cover, and said colored panels are within said box and spaced apart to expose the dyed absorbent.

ANTHONY H. LAMB.

REFERENCES CITED

The following references are of record in the file of this patent:

UNITED STATES PATENTS

| Number | Name | Date |
| --- | --- | --- |
| 2,207,097 | Logan, Jr. | July 9, 1940 |
| 2,214,354 | Snelling | Sept. 10, 1940 |
| 2,249,867 | Snelling | July 22, 1941 |
| 2,250,980 | Workman et al. | July 29, 1941 |
| 2,001,672 | Carpenter | May 14, 1935 |
| 2,069,242 | Graham | Feb. 2, 1937 |
| 2,112,322 | Wyatt | Mar. 29, 1938 |
| 2,183,256 | Gabler | Dec. 12, 1939 |
| 2,222,788 | Tonceda et al. | Nov. 26, 1940 |
| 2,363,796 | Lamb | Nov. 28, 1944 |
| 1,387,287 | Margraf | Aug. 9, 1921 |
| 1,843,234 | Karnes et al. | Feb. 2, 1932 |

FOREIGN PATENTS

| Number | Country | Date |
| --- | --- | --- |
| 389,599 | Great Britain | Mar. 23, 1933 |